Patented Apr. 6, 1948

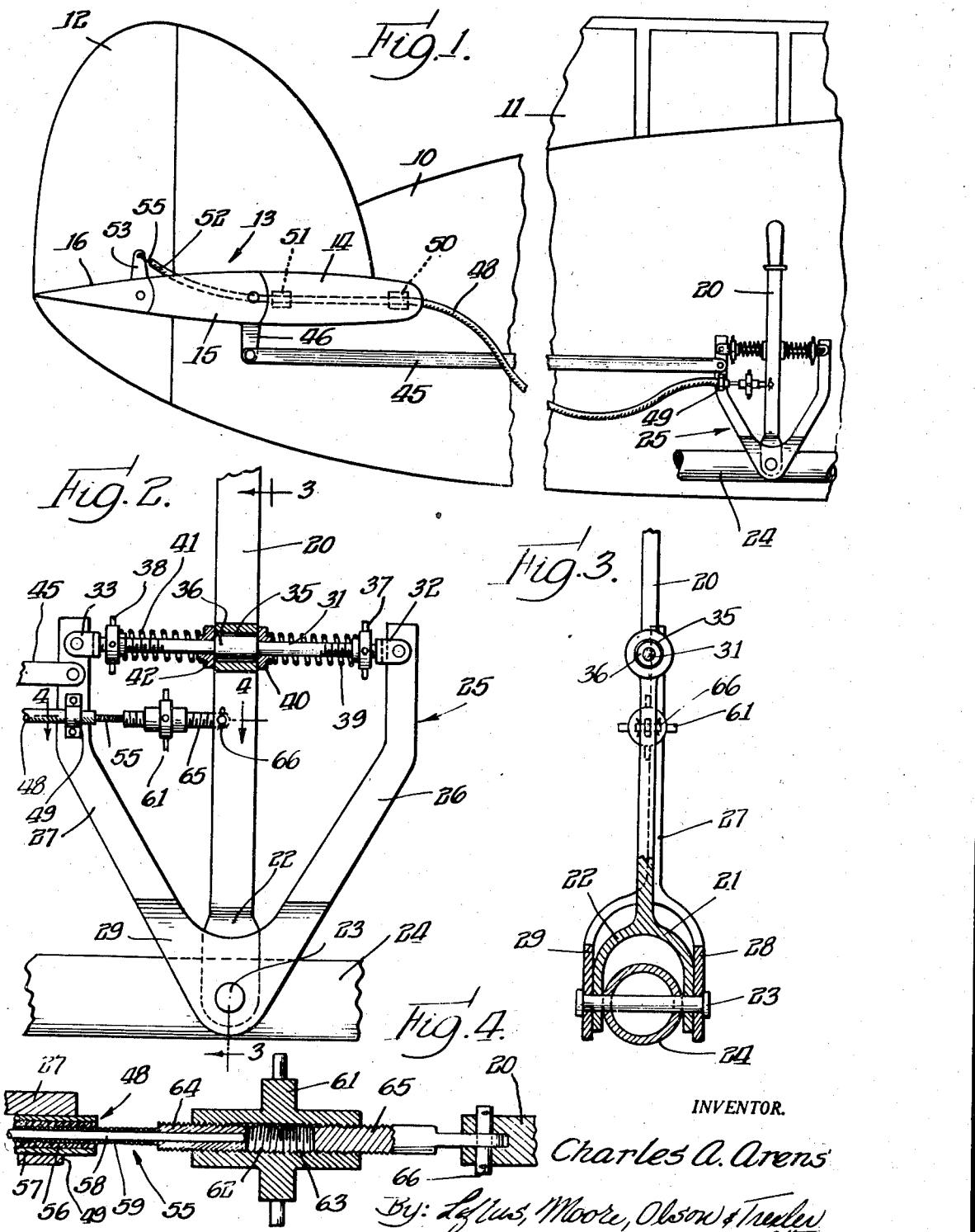

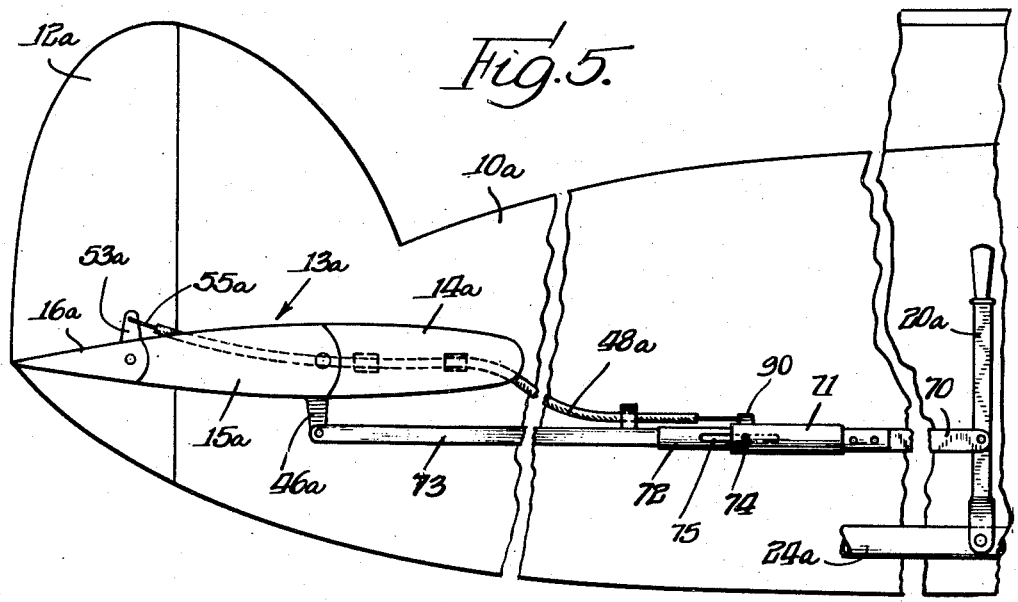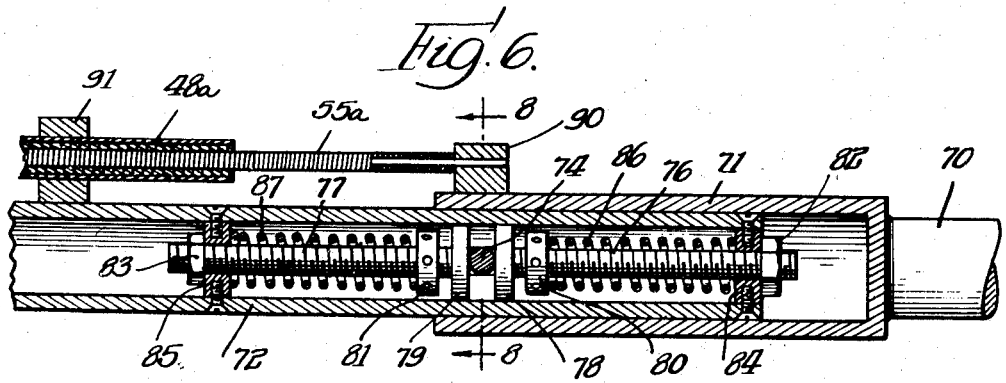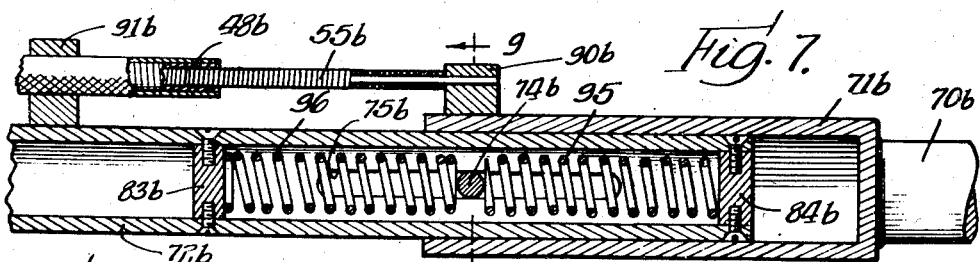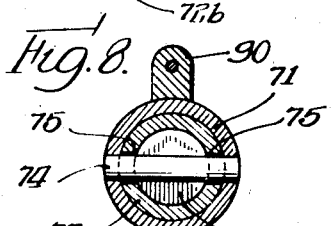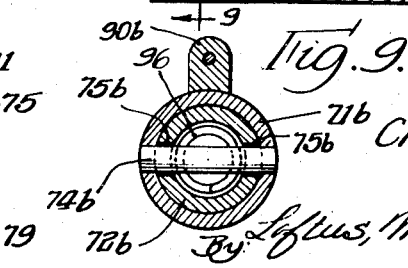

2,439,356

UNITED STATES PATENT OFFICE 2,439,356

CONTROL MECHANISM FOR RELATED CONTROL OF OPERATED MECHANISMS

Charles A. Arens, Chicago, Ill., assignor to Arens Controls, Inc., Chicago, Ill., a corporation of Illinois Application November 8, 1943, Serial No. 509,399

2 Claims. (Cl. 74—470)

This invention relates to control mechanisms, particularly of the type adapted for use with aircraft for controlling the various flight control elements thereof, such as elevators, ailerons, rudders, et cetera, and their associated tab structures.

It is an object of the invention to provide a control mechanism of the type stated, of improved construction and operating characteristics.

More specifically stated, it is an object of the invention to provide aircraft control mechanism for effecting the conjoint control of aircraft flight control elements and their associated tabs, in a predetermined and related manner.

Still more specifically stated, it is an object of the invention to provide a control mechanism wherein the tab and the associated flight control element such as an elevator, aileron, or a rudder, et cetera, are operated by a common operating member, for a predetermined sequential or co-operative action, as may be required.

A further object of the invention is to provide improved and more readily operable means for operating aircraft tab structures, and also to provide improved and more operable means for operating aircraft flight control elements.

A still further object of the invention is to provide for the cooperative and related control of a plurality of operated mechanisms from a common operating member, in an improved manner.

Various other objects, advantages and features of the invention will be apparent from the following specification when taken in connection with the accompanying drawings, wherein certain preferred embodiments of the invention are set forth for purposes of illustration.

In the drawings, wherein like reference numerals refer to like parts throughout:

Fig. 1 is a general assembly view, diagrammatic in form, of an aircraft embodying a control mechanism constructed in accordance with the principles of the invention;

Fig. 2 is a detail view, on an enlarged scale, of the control member for effecting control of the mechanism, and associated parts;

Fig. 3 is a vertical sectinoal view of the mechanism of Fig. 2, taken as indicated by the line 3—3 thereof;

Fig. 4 is a detail sectional view of a portion of the mechanism shown in Fig. 2, on a further enlarged scale, and taken as indicated by the line 4—4 of Fig. 2;

Fig. 5 is a view generally similar to Fig. 1, but illustrating a modified form of the invention;

Fig. 6 is a longitudinal sectional view, on an enlarged scale, of a portion of the control mechanism embodied in the structure of Fig. 5;

Fig. 7 is a view similar to Fig. 6, but illustrating a still further modified embodiment;

Fig. 8 is a vertical sectional view through the mechanism of Fig. 6 on the line 8—8 thereof; and Fig. 9 is a vertical sectional view through the mechanism of Fig. 7 on the line 9—9 thereof.

In the drawings the invention has been illustrated as applied to a control mechanism for effecting the conjoint control of an aircraft flight control element and associated tab structure, as the invention in certain of its important aspects is particularly adapted for an installation and use of this character. It is to be understood, however, that the invention is and may be also adapted for the conjoint control of other types of operated mechanisms from a single operated member. Further, while in the illustrated embodiment the invention has been shown applied to the aircraft elevator and its associated tab structure, it is to be understood that it is applicable, as well, to the other flight control elements, such as ailerons, rudders, et cetera.

Referring more specifically to the drawings, and first to the embodiment illustrated in Figs. 1 to 4 inclusive, it will be seen that the structure illustrated comprises an aircraft, diagrammatically shown, having a fuselage 10, a cockpit 11, rudder 12, and elevator structure generally indicated by the numeral 13. More specifically, the elevator structure comprises the usual stationary or fixed stabilizer portion 14, the control or elevator portion 15, and associated tab element 16. As will be understood, the tab 16 is generally of considerably less lateral extent than the elevator 15, so that the over-all tab area is considerably less than that of the elevator member.

In accordance with the invention, the wing control member or stick 20 is provided for operating both the elevator 15 and the tab 16, in predetermined related operation. More specifically, and as best shown in Figs. 1, 2 and 3, the control stick or lever 20 is bifurcated at its lower end, thus providing a pair of portions 21 and 22, which portions are pivotally mounted upon a pivot pin 23 carried by a rotatable torque tube 24 which may, for example, be connected to the aircraft ailerons in the usual manner. It will thus be seen that the control stick may be moved transversely of the fuselage 10 to effect rotation of the torque tube 24, and resulting movement of the ailerons controlled thereby, the control stick at the same time being mounted for pivotal operation longitudinally of the fuselage and relative to the torque tube.

A frame structure 25 of general U-shape, and comprising a pair of leg portions 26 and 27, as seen in Fig. 2, is also pivotally mounted upon the pivot pin 23. The lower portion of this frame is bifurcated to provide a pair of members 28 and 29, as seen in Fig. 3, in straddling relation to the control stick portions 21 and 22, and adapted for independent pivotal connection upon the pivot pin 23. It will thus be seen that both the control stick and the frame 25 are adapted for independent pivotal movement upon the pivot pin.

As best shown in Fig. 2, connecting means is provided between the control stick and the frame, so that normally movement of the control stick tends to produce corresponding and proportional movement of the frame. This connecting means comprises a shaft 31 having bifurcated yoke fittings 32 and 33 at its ends, which fittings are pivotally connected, respectively, to the frame legs 26 and 27. The shaft 31 extends freely through an opening 35 provided in the control stick 20. However, the shaft portion which normally lies within the control stick opening is slightly enlarged to provide a collar-like section 36, for a purpose presently to be described. The ends of the shaft 31 are screw-threaded, as indicated in Fig. 2, wing nuts 37 and 38 being adjustably mounted thereon. A compression spring 39 loosely embraces the shaft 31 and bears at one end against the adjustable wing nut 37, and at its other end against a collar 40 also loosely mounted on the shaft and normally urged by the spring into engagement with the shaft enlarged section or collar 36. Similarly a compression spring 41 loosely embraces the shaft and bears at one end against the adjustable wing nut 38 and at its other end against a loosely mounted collar 42 which is normally urged by its spring also into engagement with the shaft enlarged section or collar 36. It will be seen that as the control stick 20 is pivotally operated longitudinally of the fuselage, to the right or left as seen in Fig. 2, the described connections tend to cause the frame 25 to move as a unit with the control stick. However, if the frame 25 encounters sufficient resistance to overcome the tension of the springs, which tension is adjustably controlled by the respective wing nuts 37 and 38, the springs will yield to permit movement of the control stick independently of or without corresponding movement of the frame. More specifically, if the control stick 20 is pivoted to the right, as seen in Fig. 2, and the frame 25 encounters sufficient resistance, the spring 39 will yield permitting the control stick to continue in its movement, without corresponding movement of the frame.

In the particular embodiment illustrated, the frame 25 is arranged to effect operation of the elevator 15 by means of a link 45, Fig. 1, pivotally connected at one end to the frame and at its opposite end to a bracket 46 formed as a part of the elevator; the connections being sufficiently loose to accommodate the pivotal movements of the torque tube, or ball and socket or other universal connecting means may be employed if desired. It is to be understood, however, that any suitable or conventional operating connections may be provided between the frame 25 and the elevator, to effect the elevator control.

In accordance with the invention, the control stick 20 is also adapted to effect the operation of the tab 16, by means of suitable operating connections. In the particular embodiment illustrated a flexible wire type of control is provided. A flexible sheath 48 is connected at one end, and by means of a bracket 49, to the U-frame 25. The other end of the sheath is connected by means of brackets 50 and 51, Fig. 1, to the fixed or stabilized portion 14 of the elevator structure, the extreme end of the sheath, however, as indicated at 52 extending toward and into proximity with a bracket portion 53 formed as a part of the tab 16. As will be understood, sufficient slack is provided in the flexible sheath so as to permit free pivotal movement of the frame 25 relative to the fixed stabilizer structure 14.

A transmission member 55 is longitudinally slidable within the flexible sheath 48, this transmission member being connected at one end to the control stick 20, and at its opposite end to the bracket 53 of the tab 16. The details of the transmission member and the flexible sheath are best shown in Fig. 4. It will be seen that the flexible sheath 48 comprises a helically wound wire coil 56, encompassed by a suitable weatherproof and protective covering 57. The transmission member 55 which is longitudinally slidable within the sheath comprises a central core wire or member 58 encompassed by a helical wire coil 59, the core 58 and wire coil 59 being slidable as a unit within the helical wire sheath coil 56. It is to be understood, however, that various other specific forms of transmission members or sheathing may be employed, or that other suitable operating connections may be employed for connecting the tab 16 and the control stick 20 for correlative movement.

Referring further to Figs. 2 and 4, it will be seen that the slidable transmission member 55 is connected to the control stick 20 by means of an adjustment mechanism whereby the transmission member may be adjustably positioned with respect to the control stick. More specifically, a wing nut 61 is provided, this wing nut having a bore with right and left-hand threads at its opposite ends, as indicated at 62 and 63. The threaded bore 62 is adapted for connection with a threaded fitting 64 fixed to the end of the transmission member 55. Similarly the threaded bore 63 is adapted for connection with a threaded member 65, the end of which is pivotally connected by means of a bolt 66 to the control stick. It will be seen that by reason of the connections thus provided, the end of the transmission member 55 is connected to the control stick 20, for movement therewith, while at the same time being adjustable relative to the control stick, by manual adjustment of the wing nut 61. Adjustment of the transmission member, relative to the control stick, effects an adjustment of the positioning of the tab 16, to accommodate flight conditions, as will be understood.

As heretofore pointed out, as the control stick 20 is pivoted to the right or left as seen in Fig. 2, and unless the frame 25 encounters sufficient resistance to cause either the spring 39 or the spring 41 to yield, the frame moves as a unit with the control stick. Under such conditions it will be seen that the flexible sheath 48 connected to the frame moves with the transmission member 55 connected to the control stick 20, so that no movement or adjustment is imparted to the tab 16. However, upon yielding of one or the other of the springs, resulting in relative movement between the control stick 20 and the frame 25, corresponding relative movement occurs between the transmission member 55 and its sheath, thereby effecting correlative movement and adjustment of the tab.

The structure thus provides for the conjoint control of both the elevator and the tab in predetermined operating relationship, and from a single control member 20. The adjustment of the tension of the springs 39 and 41, by means of the wing nuts 37 and 38, predetermines the characteristics of operation. For example, if the springs are adjusted to a tension of fifty pounds, then unless the frame 25 by reason of its connection to the elevator 15 encounters a resistance to movement in excess of fifty pounds, the springs will not yield and the elevator 15 will be under direct control of the control stick 20, and no independent operation of the tab 16 will be effected. However, if, due to wind resistance, or other causes, the frame 25 by reason of its connection to the elevator encounters more than fifty pounds resistance as the control stick is operated, upon the application of a greater force to the control stick one or the other of the springs 39 or 41 will yield, depending upon the direction of the force, thereby effecting independent movement of the tab 16. The structure thus provides means for effecting movement of the tab, for example to bring the aircraft out of a dive, notwithstanding the fact that the elevator is substantially locked in position due to high speed wind resistance.

On the other hand, a relatively light adjustment of the springs 39 and 41 tends to cause movement of the tab upon a relatively lower operating force, and a sufficiently light spring adjustment would tend to cause movement of the tab before movement of the elevator, under normal flight conditions. Under all conditions of operation adjustment of the wing nut 61 produces independent adjustment of the position of the tab.

In Figs. 5 to 9 inclusive, embodiments are illustrated wherein the relatively movable control connections are remotely positioned with respect to the control stick. In this instance the control stick, indicated by the numeral 20a is connected to operate the tab element 16a and the elevator 15a, as in the previously described embodiment, but the relatively movable portions of the control mechanism are disposed in proximity to the controlled devices. In this instance the control stick is pivotally mounted upon the torque tube 24a, as in the previous embodiment, and is pivotally connected to an elongated link 70. The end of this link is shaped into a tube 71, as best shown in Fig. 6. This tube has telescoping engagement with the end of another tube 72, the latter being formed as a part of a link 73 connected to the bracket 46a of the elevator.

The tube 71 has fixed thereto a cross pin 74, Figs. 5, 6 and 8, adapted for longitudinal reciprocation within slots 75 formed in the tube 72. The two tubes are thus mounted for limited longitudinal or telescoping reciprocable movement relative to each other. The tube 72 is provided with a pair of bolts 76 and 77 having heads 78 and 79, respectively, adapted to bear against the cross pin 74. These bolt heads are mounted for free reciprocation within the bore of the tube 72. The bolts are screw-threaded along their lengths and are provided adjacent their headed ends with adjustable screw-threaded collars 80 and 81, and at their opposite ends with adjustable nuts 82 and 83. These latter nuts normally are in bearing engagement against barrier walls 84 and 85 removably mounted within the tube 72, as by means of screws or the like. A compression spring 86 bears at one end against the barrier wall 84 and at its opposite end against the adjustable collar 80 whereby to thrust the bolt 76 to the left as seen in Fig. 8 to maintain the bolt head substantially in contact with the cross pin 74, and the nut 82 against the barrier wall 84. Similarly a compression spring 87 is provided for the bolt 77, for holding its head normally substantially in engagement with the cross pin 74, and its nut 83 against the barrier wall 85.

It will be seen that by reason of the described connections, as the link 70 is shifted, resulting in the movement of the cross pin 74, corresponding increments of movement are imparted to the tube 72 and the connected elevator structure. However, as in the embodiment previously described, if resistance to movement is encountered by the tube 72, in excess of the spring adjustment, one or the other of the springs 86 or 87 will yield, depending upon the direction of the movement and force applied to the link 70.

The tube 71 carries a bracket 90 to which the end of the transmission member 55a is secured, whereas the tube 72 carries a bracket 91 to which one end of the flexible sheath 48a is connected. The opposite end of the sheath is connected to the elevator stabilizer structure, and the opposite end of the transmission member 55a is connected to the tab 16a, as in the embodiment of the invention previously described. Sufficient slack (not shown) is provided to permit free movement of the parts. It will be seen that relative movement between the tubes 71 and 72, upon yielding of one or the other of the springs 86 or 87, will result in adjustment of the tab 16a, as in the case of relative movement between the control stick 20 and the frame 25, in the embodiment previously described.

The structure illustrated in Figs. 5, 6 and 8 thus operates essentially the same as that shown in Figs. 1-4, except that the relatively shiftable portions of the control mechanism are remotely positioned with respect to the control member 20a, and may be located in juxtaposition to the devices to be controlled. This for example reduces the necessary length of the flexible sheath 48a, and associated transmission member 55a.

In Figs. 7 and 9 a further embodiment of the invention is illustrated, the same as that shown in Figs. 5, 6 and 8, except for the spring arrangement. In this instance the cross pin 74b carried by the outer sleeve 71b, which pin is shiftable within slots 75b of the inner sleeve 72b, is abutted by a pair of springs 95 and 96 which are normally relaxed, when in the position shown in Fig. 7. The springs are so designed that they are normally unyielding at the forces transmitted by the sleeve 71b, whereby to effect the actuation of the sleeve 72b, as in the previously described embodiments. However, if operating force is applied to the cross pin in excess of the force required to compress either spring, such spring will yield effecting operation of the tab control through the operation of the transmission member 55b and its associated flexible sheath 48b. The springs 95 and 96, being normally relaxed, produce a control arrangement functionally operable similar to that previously described, without sponginess, except that adjustment of the spring tension is not contemplated after assembly of the structure.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A control mechanism comprising a pair of operating members adapted selectively to effect the operation of a pair of operated devices, a composite control assembly comprising a pair of spring interconnected shiftable control members operatively connected to said operating members, one of said operating members being selectively actuated by the control members upon movement of the control members as a unit through a predetermined path of travel, and the other of said operating members being selectively actuated by the control members upon the shifting of one of said control members relative to the other along the same path of travel upon the yielding of said spring.

2. A control mechanism comprising a pair of operating members adapted respectively to effect the operation of a pair of operated devices, a composite control assembly comprising a pair of shiftable control members operatively connected to said operating members, spring means interconnecting the control members whereby one of the control members is movable relative to the other in opposite directions from a normal position, one of said operating members being selectively actuated by the control members upon movement of the control members as a unit through a predetermined path of travel, and the other of said operating members being selectively actuated in opposite directions by the control members upon the shifting of one of the control members relative to the other from normal position along the same path of travel.

CHARLES A. ARENS.

REFERENCES CITED

The following references are of record in the file of this patent:

UNITED STATES PATENTS

| Number | Name | Date |
|---|---|---|
| 1,339,332 | Greenby | May 4, 1920 |
| 1,558,486 | Klump | Oct. 27, 1925 |
| 1,662,183 | Chann | Mar. 13, 1928 |
| 1,671,081 | Miller | May 22, 1928 |
| 2,056,942 | Krueger | Oct. 3, 1936 |
| 2,272,725 | Overbeke | Feb. 10, 1942 |
| 2,312,274 | Stortz | Feb. 23, 1943 |
| 2,370,844 | Davis | Mar. 6, 1945 |

FOREIGN PATENTS

| Number | Country | Date |
|---|---|---|
| 412,392 | Germany | Apr. 20, 1925 |
| 2,172 | Great Britain (1903) | Jan. 7, 1904 |
| 268,439 | Great Britain | Apr. 1, 1927 |
| 303,488 | Great Britain | May 25, 1928 |
| 383,590 | Great Britain | Nov. 17, 1932 |
| 542,944 | Great Britain | Feb. 3, 1942 |